Dec. 11, 1951 R. G. RUSSELL ET AL 2,577,920
APPARATUS FOR MIXING VISCOUS LIQUIDS
Filed Dec. 6, 1944 3 Sheets-Sheet 3
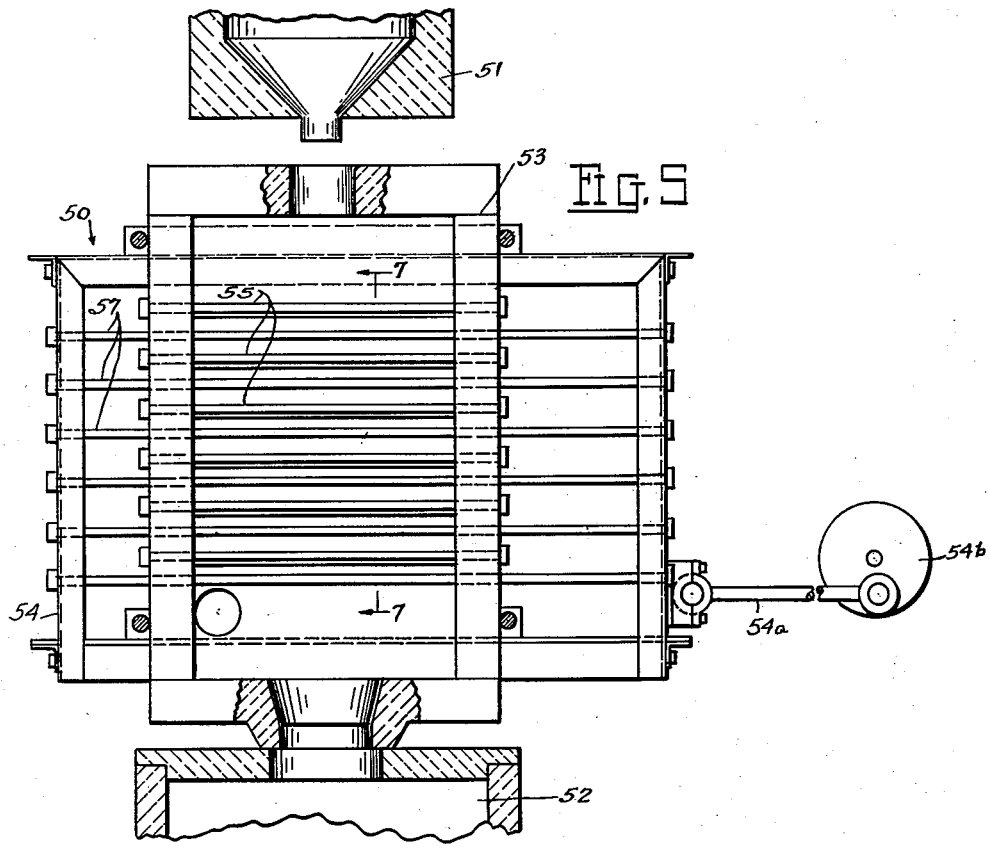
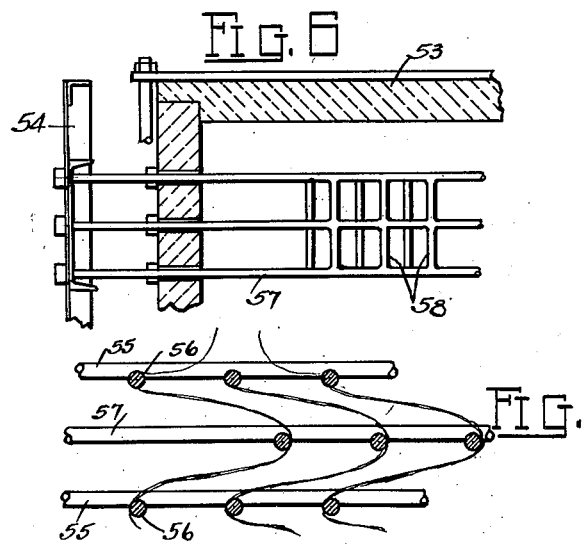
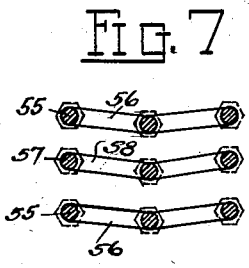
INVENTORS
Robert G. Russell
Ronald B. Wiley
BY
Staelin & Overman
Attorneys.

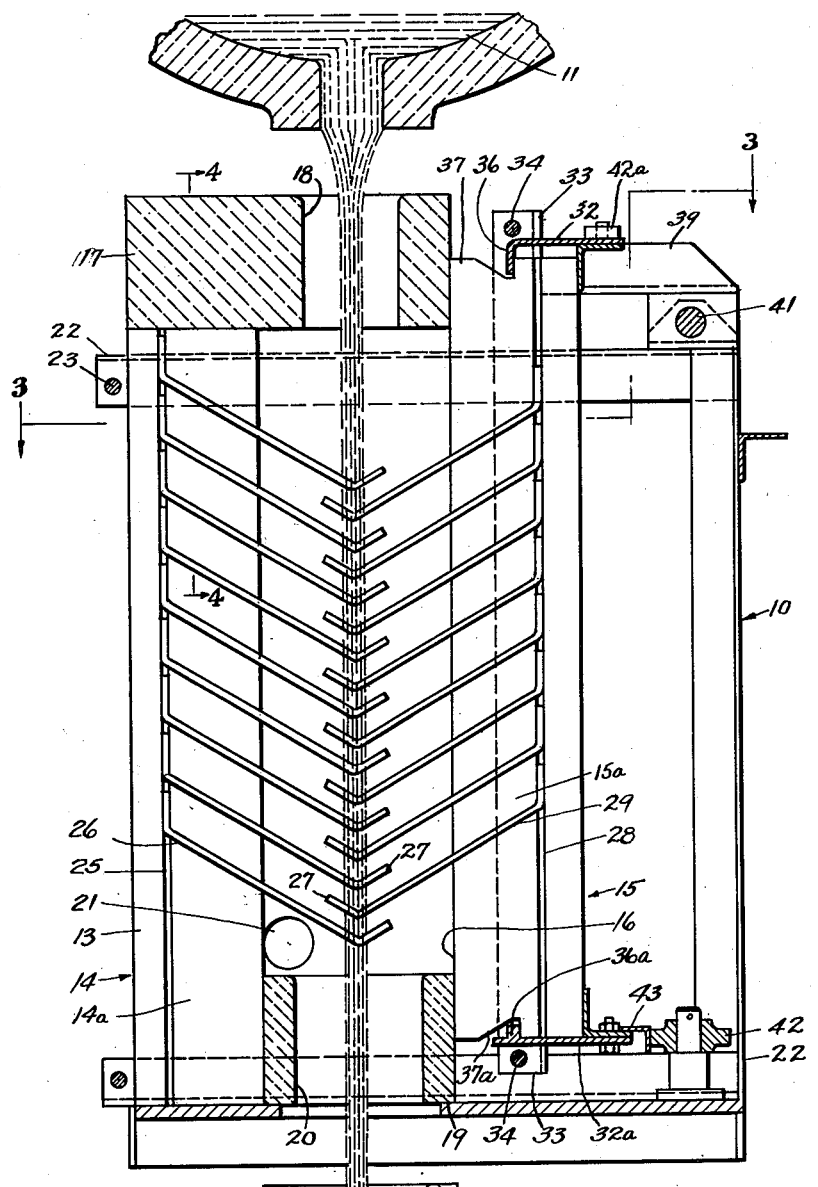
Fig. 1
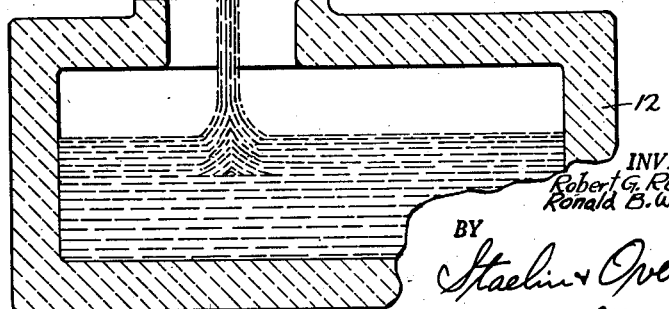

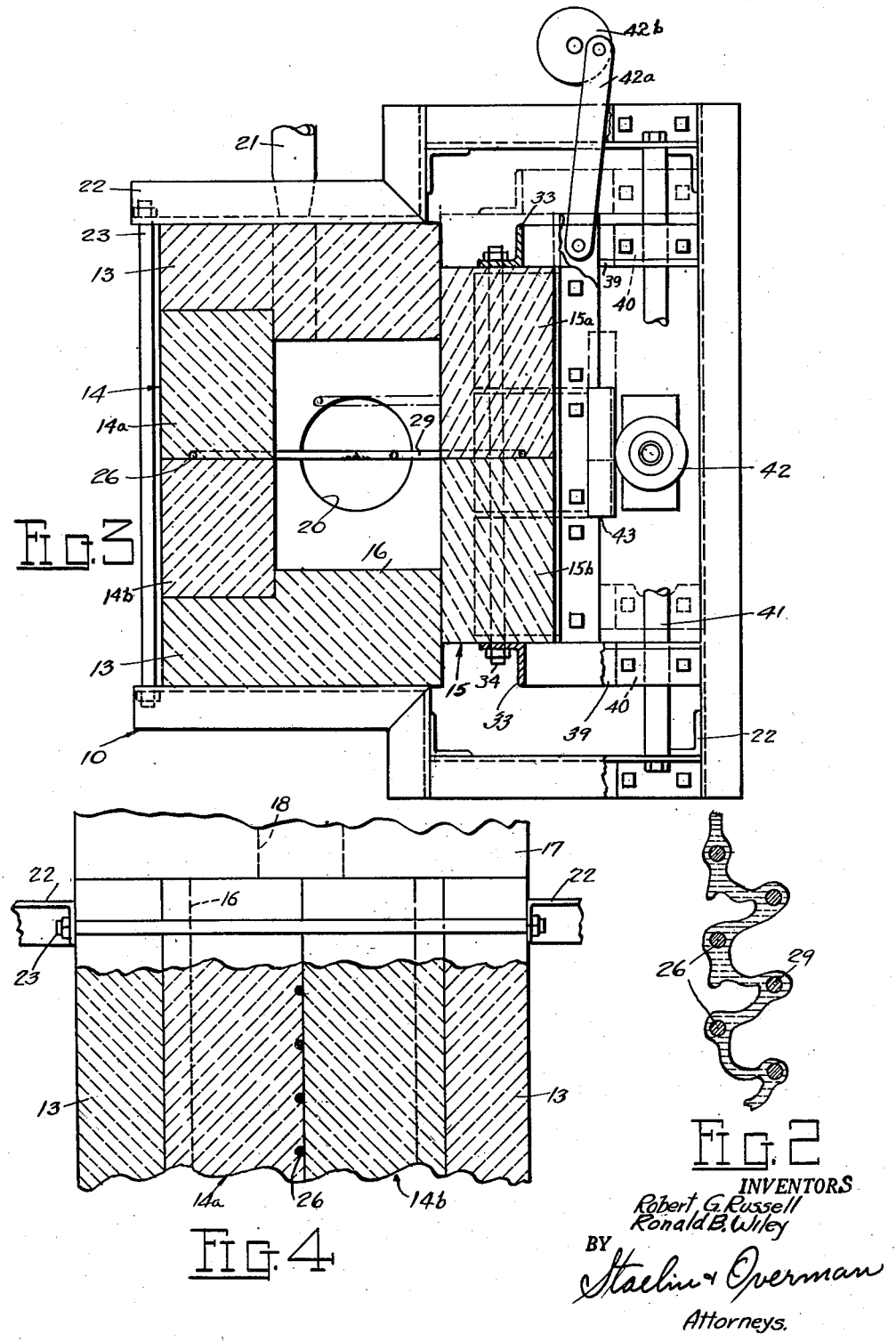

UNITED STATES PATENT OFFICE 2,577,920

APPARATUS FOR MIXING VISCOUS LIQUIDS

Robert G. Russell and Ronald B. Wiley, Newark, Ohio, assignors to Owens-Corning Fiberglas Corporation, Toledo, Ohio, a corporation of Delaware Application December 6, 1944, Serial No. 566,892

3 Claims. (Cl. 259—19)

This invention relates to an improved apparatus for mixing viscous liquids, and particularly materials requiring mixing at elevated temperatures. Some such liquids may be thermoplastic resinous materials, asphalt or asphalt compositions, or molten glass. It is with molten glass that the present invention has been found especially adaptable and in connection with which it will now be described.

The quality and homogeneity of molten glass is contingent to a large degree upon its freedom from cords, seeds and stones or other foreign particles which are quite often found in newly melted glass and even in glasses that have been subjected to normal refining processes. Various methods may be resorted to either to eliminate entirely or to reduce such non-uniformities to a point where their presence does not materially affect the character of the glass.

Cords normally are bodies of different viscosity and density than the surrounding glass and without mechanical movement may require prolonged heating to effect their dissipation. This adds to the expense of making glass by requiring the entire body to be subjected to a high degree of heat for an extended period of time. One means of obtaining a homogeneous mixture is by stirring the molten glass. Stirring permits the escape of seed forming gases and attenuates any cords in the fluid body to the point where they are more readily dissolved. All previously employed manners of stirring, however, required prolonged agitation of large masses of molten glass to effect any substantial degree of intermixing of the mass, and the consequent great consumption of power and time made these methods economically unfeasible for most glass forming operations.

It is the primary object of this invention to reduce the refining time of a body of glass to a minimum by employing mechanical refining means and it is an ancillary object of the invention to effect a continuous refining operation by engaging small amounts of glass at a time and thereby greatly reducing the power required for mixing the entire body.

High quality glass of the character obtainable by this invention has many and diversified uses. One especially important use of high quality g·ass is in the manufacture of very fine glass fibers or filaments of the type commonly employed in producing glass wool, yarns or threads. Glass fibers approaching microscopic fineness are usually drawn from molten glass flowing through a multiplicity of orifices of small diameter formed in the bottom of a bushing or a container for molten glass. Uninterrupted flow of glass through the very small bushing orifices is difficult to maintain and this difficulty is greatly increased when large cords are present which clog the orifices so that the diameter of the glass stream is greatly reduced or the stream is broken.

The present invention contemplates improving the quality of glass by subjecting the glass while in a molten state to such a thorough mixing that any cords existing in the molten glass are substantially dissipated or thinned out to such an extent that they cannot interfere with proper flow of the glass through these small orifices. In accordance with this invention, molten glass is caused to flow from a suitable source in the form of a stream to a point of distribution and the homogeneity of the glass is increased as it flows to the point of distribution by successively and progressively extending and stretching the stream of molten glass in opposite directions laterally with respect to the normal path of flow of the glass and recombining it.

Cords are most adequately dissipated by applying traction forces to the molten body whereby relative movement between small portions of the body is affected. This may be achieved by restraining the flow of portions of the body while closely adjacent portions are induced to move. The viscous nature of the glass is such that applied motion is resisted to the extent that the cords or dense bodies are gradually drawn out or sheared into thin filaments which are more readily dissolvable at the melting heat.

Another object of this invention is to provide glass mixing means having pairs of oppositely disposed complementary members located in the normal path of flow of the glass stream in vertically spaced relation to each other and having means for moving the lowermost member of each pair back and forth across the normal path of flow of the glass stream at a rate predetermined to enable the molten glass to droop between the members. As a result, the molten glass is folded and refolded upon itself and any cords existing in the molten glass are drawn out first in one direction and then in the opposite direction until they are finally dissipated.

A further object of this invention is to provide glass mixing means having a plurality of members spaced from each other in the direction of normal flow of the glass stream and in the path of the stream and having means for moving alternate members in opposite directions across the normal path of flow of the stream to insure thorough mixing of the glass as it flows from the source of supply to the point of distribution.

The foregoing, as well as other objects, will be made more apparent as this description proceeds, especially when considered in connection with the accompanying drawings, wherein:

Figure 1 is a diagrammatic sectional view through a glass mixing device embodying the features of this invention;

Figure 2 is a diagrammatic sectional view illustrating the action of the glass mixing device shown in Figure 1;

Figure 3 is a cross-sectional view taken substantially on the plane indicated by the line 3—3 of Figure 1;

Figure 4 is a fragmentary sectional view taken substantially on the plane indicated by the line 4—4 of Figure 1;

Figure 5 is a diagrammatic side elevational view of a modified form of mixing device illustrated with one side wall removed;

Figure 6 is a fragmentary horizontal sectional plan view of the modified device shown in Figure 5;

Figure 7 is a vertical sectional view taken substantially along the line 7—7 of Figure 5; and Figure 8 is a diagrammatic elevational view indicating the flow of glass through the mixer.

Referring first to the embodiment of the invention shown in Figures 1 to 4, inclusive, it will be noted that the reference character 10 indicates a molten glass mixing device adapted to be positioned between a source of supply 11 of molten glass and a collecting pool 12 which serves as a point of distribution for the molten glass. The source of supply 11 may comprise any one of numerous types of glass melters or receptacles adapted to contain a body of molten glass and the pool 12 may be employed to recondition the glass to provide a uniform working temperature as well as a sufficient volume of glass for supplying glassware forming machines or fiber forming processes.

The mixing device 10 comprises a substantially rectangular body preferably formed of a refractory material capable of withstanding extremely high temperatures and having front and rear side walls 13 and end walls designated generally by the numerals 14 and 15 which define a chamber 16 or passage extending through the body. A cover wall 17 having a flow opening 18 closes the upper end of the chamber and a bottom wall 19 is provided with a discharge orifice 20 through which the glass flows to the pool 12. The chamber may be heated by a burner 21 to maintain the molten glass passing therethrough at the proper temperature for mixing. The walls are held in position by means of structural supporting members or framework 22 and tie bolts 23.

The wall 14 is split substantially along its vertical center line into sections 14a and 14b, one of which is provided in the face adjacent the other of said sections with grooves 25 adapted to receive and individually support one end of a vertically arranged set of stationary pins 26. The pins forming a part of the mixing apparatus extend downwardly into the chamber 16 and have upturned ends 27 positioned to lie within the normal path of flow of the molten stream of glass so that the glass cascades over the pins as it flows toward the discharge orifice 20. The angular formation of the pins tend to hold the glass substantially in the path of the stream and prevent it from spreading along the pins.

The wall 15 closing the side of the chamber opposite the wall 14 is adapted for horizontal sliding movement to transmit motion for mixing the glass. The wall construction is generally similar in part to the wall 14 except for having a greater width and comprises a pair of sections 15a and 15b into one of the adjacent faces of which are provided grooves 28 for supporting pins 29. The grooves and pins correspond substantially with the grooves 25 and pins 26 previously described. The lower ends of the pins 29 are adapted to pass between pairs of the pins 26 as the wall 15 is moved. This provides for lateral movement of the pins 29 across the path of flow of the glass as will be brought out in detail presently.

The blocks forming the walls 15 are supported between upper and lower plates 32 and 32a and are held together by means of vertically disposed angle bars 33 and tie bolts 34 which also serve as clamps for holding the plates 32 and 32a in position. The plates 32 and 32a have inturned ends 36 and 36a, respectively, which engage in grooves 37 and 37a in the blocks to preserve and maintain proper alignment.

The wall section is supported by means of extensions 39 attached to the upper end of the angles 33 and provided with bearing members 40 slidably mounted on a horizontally disposed rod 41 secured between members of the frame 22. The wall 15 is held in vertical alignment with the chamber walls by means of a roller 42 adapted to rotate about a vertical axis and mounted on the base of the frame 22. A guide plate 43 carried by the lower plate 32a bears against the roller 42 at all times as the wall is reciprocated by any suitable and conventional means such as a pitman 42a pivoted at one end to one of the extensions 39 and at the other end to crank disk 42b.

The molten glass flows in the form of a stream from the source 11 into the chamber through the intake port 18 at a temperature suitable to provide sufficient viscosity for effective mixing. It will be noted that as the molten glass passes in a downward direction through the chamber, it is engaged by the uppermost stationary pin 26 and flows therearound and into contact with the next adjacent pin 29. The pin 29, however, moves back and forth with the wall 15 across the path of the molten stream. The rate of movement of the pins is predetermined according to the viscosity and rate of flow of the glass as it cascades over the pins to draw the molten glass in one direction laterally with respect to its normal path to the position indicated in Figure 2 of the drawings.

The rate of movement of the wall 15 is actually relatively slow so that the glass droops between the pins 26 and 29 and may form substantial loops in the manner indicated by the numeral 45 in Figure 2 of the drawings. Thus, as the wall 15 moves in the opposite direction across the normal path of flow of molten glass, the glass is not only drawn in a reverse direction but is folded upon itself. The folded loop of glass suspended between one pair of pins 26 and 29 is engaged by the next lower stationary pin and is seized by the hot glass thereon. Assuming a cord to be a unitary mass for purposes of illustration, the first movement of the pins effects a primary degree of stringing out. The loop formed by the drooping glass is folded on itself and as the pins approach the center position the bottom of the loop may become attached to the next lower pin so that continued movement of the pins attenuates a doubled cord of decreased diameter. Upon the return movement of the pins the cords are again folded upon themselves to become four in number. Repeated action effects an infinite multiplication of movement within the moving body of glass and the continued stretching and steady decrease in diameter of the cords gradually disintegrates the cords to the point where they are either assimilated entirely or are of such small dimensions as to be inconsequential. The spacing of the pins is of relative importance so that at a given viscosity the movable pin exerts a shearing or tearing action on the glass as it passes between the stationary pins. This mixing action also provides for combining a portion of fresh unmixed glass with glass already once acted upon so that each succeeding pass of the movable pins past the stationary pins tends to further subdivide the glass and recombine portions thereof.

This cycle of operation is continuously repeated by the succeeding pins as the molten glass passes through the chamber, with the result that individual portions of glass within a given length of the stream are thoroughly mixed together. Any cords existing in the molten glass introduced to the chamber are drawn-out as well as folded and refolded to such a degree that in most instances the molten glass discharged from the orifice 15 is substantially free from cords. The temperature of the glass as it leaves the mixer may be such that it requires additional heating or cooling and this is accomplished within the collecting pool 12 before it is drawn off for fabricating.

Referring now to the modified form of the invention shown in Figures 5 to 8 inclusive, it will be noted that this embodiment differs principally from the first described form of the invention in that the means for drawing the glass in opposite directions comprises a grid which reciprocates or moves back and forth in the path of the flowing stream. In detail, the mixer 50 shown in Figure 5 of the drawings may be positioned between a source of supply 51 of molten glass and a collecting receptacle 52 or other point of distribution in the same manner as the mixer 10 previously described.

The mixer 50 comprises a stationary member 53 and a reciprocable member 54. The stationary member 53 is in the form of a refractory walled chamber having vertically spaced sets of rods 55 extending from one side wall of the chamber to the opposite side wall and positioned to intercept the flow of molten glass through the chamber. In the embodiment shown in Figures 5 to 8 inclusive, each set 55 comprises several laterally spaced rods, three having been found sufficient for practicing the invention, and the rods of one set are vertically aligned with the corresponding rods of the next adjacent set. The rods in each set are connected together by a plurality of bars 56 and cooperating therewith to form in effect a lattice-like or grid construction. The grids are preferably formed of a heat resistant metal.

The reciprocable member 54 is supported for sliding movement in the general direction of length of the rods 55 on the stationary member 53 and is provided with vertically spaced sets of rods 57. The rods 57 extend through suitable openings formed in opposite side walls of the stationary member 53 and have their opposite ends respectively anchored in the opposite side walls of the reciprocable member 54 in the manner clearly shown in Figure 6 of the drawings.

Each set of rods 57 comprises three laterally spaced rods interconnected by cross bars 58 in the same manner as the sets 55. The sets of rods 57 supported by the reciprocable member 54 are arranged between adjacent grid members 55. It is also pointed out that the center rod of each of the sets 55 and 57 is positioned at a somewhat lower elevation than the remaining two rods so that the molten glass is directed inwardly toward the center of the grid.

The stream of molten glass flowing onto the grid formed by the rods 55 flows around the rods and into contact with the reciprocating rods 57. The movement of these rods causes the glass to be drawn lengthwise of the rods which movement is restrained by the cross bars 56 as shown in Figure 8. This provides for attenuating the glass and permits the thinned areas to droop due to the relatively low viscosity at high temperature so that the return movement of the grid produces a mixing action of the glass. The mixing occurs at a geometrically progressive rate so that only a few movements are necessary to thoroughly mix the glass.

The reciprocable member 54 is moved in opposite directions by any suitable and conventional mechanism such as the pitman 54a pivoted at one end to the member 54 and at the other end to a crank disk 54b which is rotated in ordinary fashion. Reciprocation of the member 54 is at a rate predetermined by the rate of flow and viscosity of the molten glass to draw the glass laterally to the direction of flow of the stream.

The action of this form of the invention on the stream of glass is substantially similar to that previously described in connection with the preferred embodiment. The glass discharged from the mixer may be collected in a refining pool to provide a uniform temperature for further fabrication.

Various modifications may be made within the spirit and scope of the appended claims.

We claim:

1. Apparatus for mixing molten glass comprising means for flowing molten glass in a downward direction in the form of a stream, supporting elements respectively positioned at opposite sides of the stream and extending in the general direction of flow of the stream, a group of members extending inwardly from one of the supporting elements with adjacent members spaced vertically from one another and having the inner ends thereof projecting crosswise of the glass stream, a second group of members extending inwardly from the other supporting element and having the inner ends respectively projecting across the glass stream between adjacent members in the first group, and means for imparting a reciprocal movement to one of the supporting elements to move the members thereon in opposite directions crosswise of the glass stream.

2. Apparatus for mixing molten glass comprising means for flowing molten glass in a downward direction in the form of a stream, supporting elements respectively positioned at opposite sides of the normal path of travel of the stream, a group of members extending inwardly from one of the supporting elements and having the inner ends projecting into the stream of glass in vertical spaced relationship, a second group of members extending inwardly from the other supporting element and having the inner ends respectively projecting into the glass stream between adjacent members of the first group, and means for moving one of the supports to move the group of members carried thereby relative to the other group of members crosswise of the glass stream.

3. Apparatus for mixing molten glass comprising means for flowing molten glass in a downward direction in the form of a stream, supporting elements respectively positioned at opposite sides of the normal path of travel of the glass stream, a group of members extending from one of the members in a downward direction toward the glass stream and having the ends projecting into the glass stream in vertical spaced relationship, a second group of members extending in a downward direction from the other supporting element and having the ends respectively projecting into the glass stream between adjacent members of the first group, and means for imparting a general reciprocal motion to one of the supporting elements to move the members carried thereby back and forth across the glass stream.

ROBERT G. RUSSELL.
RONALD B. WILEY.

REFERENCES CITED

The following references are of record in the file of this patent:

UNITED STATES PATENTS

| Number | Name | Date |
|---|---|---|
| 777,162 | Volkmann | Dec. 13, 1904 |
| 1,112,569 | Shean et al. | Oct. 6, 1914 |
| 1,986,575 | Honiss | Jan. 1, 1935 |
| 1,993,235 | Adams et al. | Mar. 5, 1935 |
| 2,121,143 | Engels | June 21, 1938 |
| 2,225,369 | Danner | Dec. 17, 1940 |
| 2,238,800 | Mueller | Apr. 15, 1941 |
| 2,261,034 | McAlphine | Oct. 28, 1941 |
| 2,330,324 | Adams | Sept. 28, 1943 |
| 2,411,031 | Deyruk | Nov. 12, 1946 |

FOREIGN PATENTS

| Number | Country | Date |
|---|---|---|
| 792,996 | France | Nov. 7, 1935 |